(12) United States Patent
Kreitzer et al.

(10) Patent No.: US 8,392,528 B2
(45) Date of Patent: Mar. 5, 2013

(54) ARCHITECTURE FOR SHARING PODCAST INFORMATION

(75) Inventors: Stuart S. Kreitzer, Coral Springs, FL (US); Joseph L. Dvorak, Boca Raton, FL (US); Charles D. Estes, Fort Lauderdale, FL (US)

(73) Assignee: Motorola Mobility LLC, Libertyville, IL (US)

( * ) Notice: Subject to any disclaimer, the term of this patent is extended or adjusted under 35 U.S.C. 154(b) by 1774 days.

(21) Appl. No.: 11/284,751

(22) Filed: Nov. 22, 2005

(65) Prior Publication Data

US 2007/0118853 A1  May 24, 2007

(51) Int. Cl.
*G06F 15/16* (2006.01)
*G06F 12/00* (2006.01)

(52) U.S. Cl. .................................. 709/218; 709/217

(58) Field of Classification Search .................. 709/203, 709/250, 217, 218, 227, 245, 238; 455/37, 455/39

See application file for complete search history.

(56) References Cited

U.S. PATENT DOCUMENTS

| | | | |
|---|---|---|---|
| 2005/0004995 A1 | 1/2005 | Stochosky et al. | |
| 2005/0097225 A1* | 5/2005 | Glatt et al. | 709/248 |
| 2005/0136949 A1 | 6/2005 | Barnes | |
| 2005/0187976 A1 | 8/2005 | Goodman et al. | |
| 2006/0047580 A1* | 3/2006 | Saha | 705/26 |
| 2006/0156228 A1* | 7/2006 | Gallo et al. | 715/523 |
| 2006/0248209 A1* | 11/2006 | Chiu et al. | 709/231 |
| 2006/0265409 A1 | 11/2006 | Neumann et al. | |
| 2006/0265503 A1* | 11/2006 | Jones et al. | 709/227 |
| 2007/0011145 A1* | 1/2007 | Snyder | 707/3 |
| 2007/0060109 A1* | 3/2007 | Ramer et al. | 455/414.1 |
| 2007/0061229 A1* | 3/2007 | Ramer et al. | 705/35 |
| 2007/0061363 A1* | 3/2007 | Ramer et al. | 707/104.1 |
| 2007/0078709 A1* | 4/2007 | Rajaram | 705/14 |
| 2007/0083762 A1* | 4/2007 | Martinez | 713/176 |
| 2007/0100690 A1 | 5/2007 | Hopkins | |
| 2007/0118425 A1* | 5/2007 | Yruski et al. | 705/14 |
| 2007/0294723 A1* | 12/2007 | Dvorak et al. | 725/35 |

OTHER PUBLICATIONS

Patent Cooperation Treaty, "PCT Search Report and Written Opinion of the International Searching Authority" for International Application No. PCT/US2008/80762, Feb. 15, 2008, 7 pages.
United States Patent and Trademark Office, "Non-Final Rejection" for U.S. Appl. No. 11/284,750, Apr. 14, 2008, 11 pages.

* cited by examiner

Primary Examiner — Zarni Maung

(57) ABSTRACT

A communication construct used for sharing podcast information associated with a podcast can include a link sent to a remote device (103) while playing the podcast, appended metadata to the link, and a communication packet enabling a user to transfer the link and the appended metadata while the user is playing the podcast. The link can be a universal record locator (URL) to the podcast and the appended metadata can include constructs having start times or end times for the podcast, bookmarks for portions of the podcast, digital rights management information, display description, podcast category, or relevant images. The appended metadata can also include URLs for mobile blogging, a sender's weblog, a video blog, a social contact site, contact information from a sender, or a vCard record. The communication constructs enable podcatcher software in a user's computer or remote device to automatically download the podcast associated with the link.

20 Claims, 2 Drawing Sheets

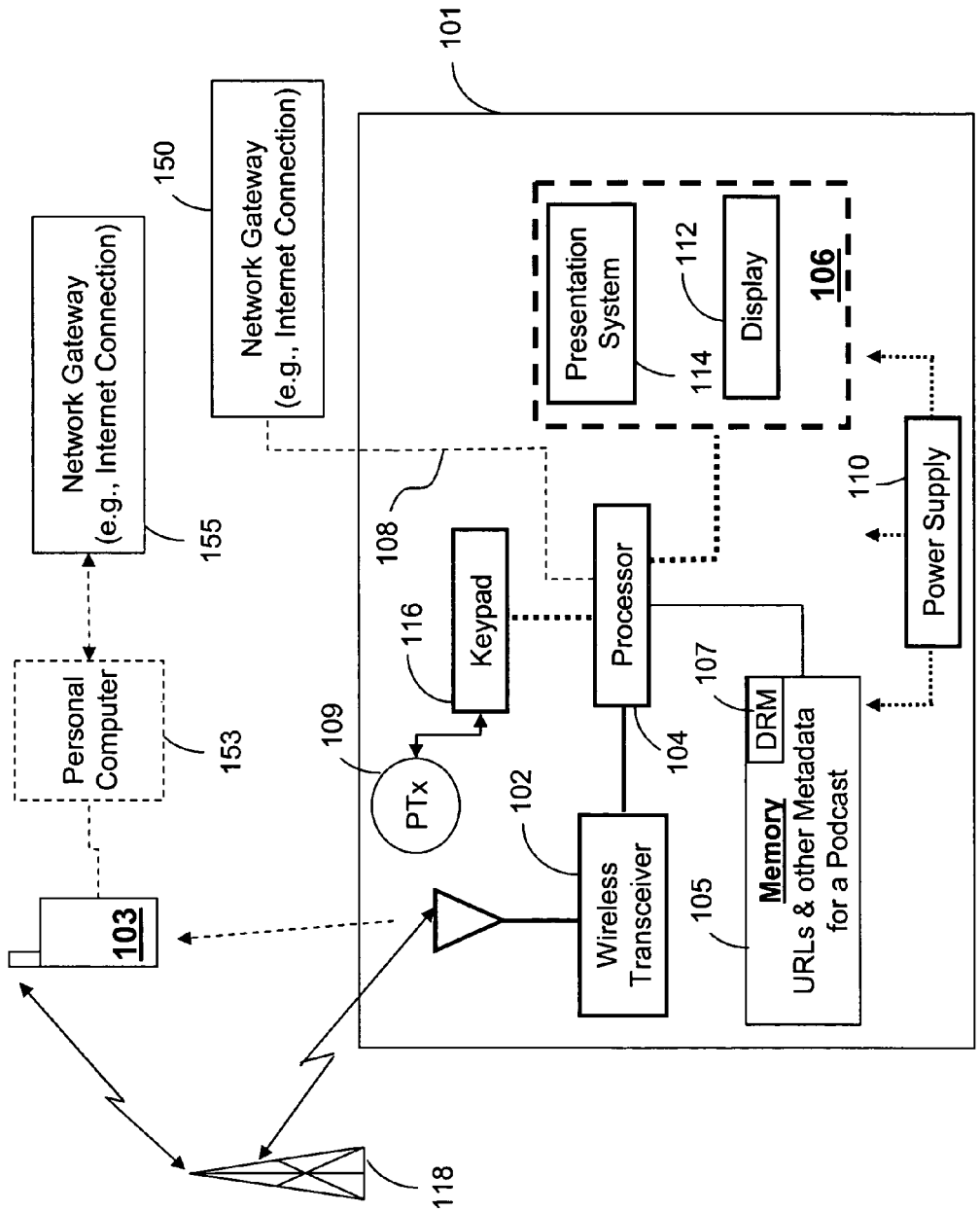

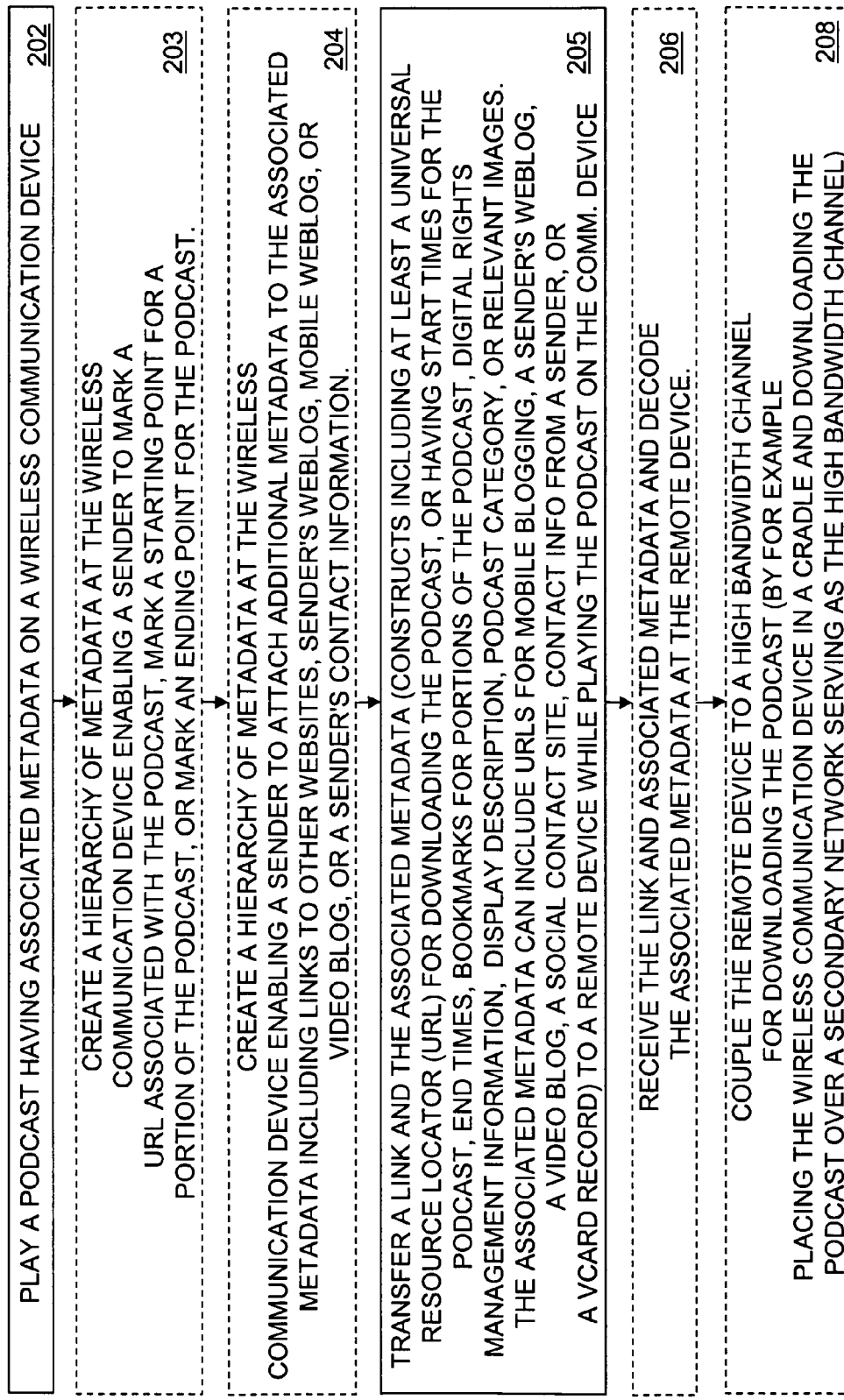

ARCHITECTURE FOR SHARING PODCAST INFORMATION

FIELD

This invention relates generally to podcasts, and more particularly to a method and system for sharing podcast information while playing a podcast presentation.

BACKGROUND

Podcasting is a known method of publishing audio and video programs via the Internet, allowing users to subscribe to a feed of files that usually come in MP3 format. Although "Podcasting" in its strictest sense is distinct from other types of online media delivery because of its subscription model, which uses a feed to deliver an enclosed file, the word "Podcast" is frequently used to describe the posting of any link to a media-player-compatible audio file on a website. Some radio personalities post MP3 versions of their shows daily, and even though these are simple download links and not part of any subscription model, they are nonetheless typically referred to as "Podcasts." Listeners may subscribe to feeds using "podcatching" software, which periodically checks for and downloads new content automatically. Most podcatching software enables the user to copy podcasts to portable music players. Any digital audio player or computer with audio-playing software can play podcasts.

Many cellular phones now include MP3 functionality and enable the listening of Podcasts. Sharing information about a particular podcast with a friend or colleague today involves calling or emailing your friend or colleague, probably after writing down the universal/uniform resource locators of the podcast.

SUMMARY

Embodiments in accordance with the present invention can provide a data construct and a way to easily share great podcasts (or easy access thereto) with their friends and colleagues. If a listener enjoys a particular podcast on a mobile phone and would like to share or refer the podcast to another user perhaps because it is very entertaining or contains information that would be of interest to the other party, then embodiments herein enable such access to other users along with the ability to annotate or comment on such podcasts and transmit such annotation or commentary with others.

In a first embodiment of the present invention, a communication construct used for sharing podcast information associated with a podcast can include a link or hyperlink capable of being sent to a remote device while playing the podcast, metadata appended to the link associated with the podcast, and a communication packet enabling a user to transfer the link and the appended metadata while the user is playing the podcast. The link can be a universal record locator (URL) to the podcast and the metadata appended can include constructs having start times for the podcast, end times for the podcast, bookmarks for portions of the podcast, digital rights management information, display description, podcast category, or relevant images. The appended metadata can also include URLs for mobile blogging, a sender's weblog, a video blog, a social contact site, contact information from a sender, or a vCard record. The communication constructs enable podcatcher software in a user's computer to automatically download the podcast associated with the link. Note, the link and associated metadata is decoded at the remote device to enable customized retrieval of content, where the remote device can retrieve the podcast associated with the link via a high bandwidth channel for downloading the podcast. The communication construct can be a hierarchy of metadata enabling a sender to mark a URL associated with the podcast, mark a starting point for a portion of the podcast, or mark an ending point for the podcast. The communication construct can further include a hierarchy of metadata enabling a sender to attach additional metadata to the associated metadata including links to other websites, links to a sender's weblog, mobile weblog, or video blog, or a sender's contact information. Note, a hyperlink is known as a link from a hypertext file to another location or file which is typically activated by clicking on a highlighted word or icon at a particular location on a screen. Of course, a link or hyperlink as used interchangeably here should not be limited to the traditional definition of hyperlink, but should include other reasonably equivalent links that can generally enable the download of podcasts.

In a second embodiment of the present invention, a user interface for creating a communication construct used for sharing podcast information associated with a podcast can include an input device for creating or retrieving a link capable of being sent to a remote device while playing the podcast, means for appending metadata to the link associated with the podcast, and a communication packet generator enabling a user to transfer the link and the appended metadata while the user is playing the podcast. The link can be a universal record locator (URL) to the podcast and the appended metadata can be constructs having start times for the podcast, end times for the podcast, bookmarks for portions of the podcast, digital rights management information, display description, podcast category, or relevant images. The appended metadata can also include URLs for mobile blogging, a sender's weblog, a video blog, a social contact site, contact information from a sender, or a vCard record. The communication construct can enable podcatcher software in a user's computer to automatically download the podcast associated with the link. The link and associated metadata can be decoded at the remote device to enable customized retrieval of content. The remote device can retrieve the podcast associated with the link via a high bandwidth channel for downloading the podcast.

The communication construct can include a hierarchy of metadata enabling a sender to mark a URL associated with the podcast, mark a starting point for a portion of the podcast, or mark an ending point for the podcast. The communication construct can further include a hierarchy of metadata enabling a sender to attach additional metadata to the associated metadata including links to other websites, links to a sender's weblog, mobile weblog, or video blog, or a sender's contact information.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 1 is a block diagram of a system for sharing podcast information in accordance with an embodiment of the present invention.

FIG. 2 is a flow chart illustrating a method of sharing podcast information in accordance with an embodiment of the present invention.

DETAILED DESCRIPTION OF THE DRAWINGS

While the specification concludes with claims defining the features of embodiments of the invention that are regarded as novel, it is believed that the invention will be better understood from a consideration of the following description in conjunction with the figures, in which like reference numerals are carried forward.

Referring to FIG. 1, a block diagram of a wireless communication system 100 is shown for sharing podcast information in accordance with an embodiment herein. The podcast information can be carried in a mobile device or a wireless communication device 101 such as a selective call receiver or transceiver that can include a transceiver 102 and a processor 104 coupled to the transceiver 102. The processor 104 can be programmed to receive podcast information and other information and/or content over a wireless network or a wired network via a local access point 150 device network gateway for example. Note, the transceiver 102 can be a part of a cellular phone, a satellite phone, a smart phone, a laptop computer, a personal digital assistant, or a two-way messaging device or other communication device and the local access point 150 can be any type of connection to podcast content such as an Internet connection.

The wireless communication device 101 can further include a user interface 106 having a presentation system 114 (such as audio speakers and amplifiers) and a display 112. The wireless communication device 101 can further include a keypad 116, a memory 105 for storing URLs, metadata, podcast content (etc.), and a power supply 110. The device 101 can further include a digital rights management module 107 which can be part of the memory 105. The wireless communication device 101 can further optionally or alternatively include a data bus, link, or interface 108 for coupling the processor 104 with the gateway 150 in a wired or tethered fashion as opposed to a wireless link. The wireless transceiver 102 can utilize existing technology for exchanging wireless messages with a base station 118 over a link or network to communicate to another wireless device 103 that the user of device 101 wishes to share podcast information with. Once the wireless device 101 transmits a podcast link or URL and other metadata to the wireless device 103, the wireless device 103 can retrieve the podcast content from an appropriate network gateway 155 such as an internet connection via their personal computer 153 for example. The wireless device may also be able to retrieve podcast content using its own high-speed wireless data connection, if available, as an alternative to connecting to the internet via a personal computer 153. Of course, the device 101 can also communicate directly to device 103 if applicable wireless technologies are utilized (Bluetooth, WiFi, Talkaround, etc.). The wireless technology used can be any wireless technology such as, for example, GSM (Global System for Mobile communication), TDMA (Time Division Multiple Access), or CDMA (Code Division Multiple Access), just to mention a few.

The processor 104 can use computing and/or processing such as a microprocessor and/or a DSP (Digital Signal Processor) technology. Additionally, the processor 104 can include media such as RAM (Random Access Memory), DRAM (Dynamic RAM), ROM (Read Only Memory), and/or Flash memory for data processing and storage. The presentation system 114 can use audio technology for intercepting and conveying audible signals to or from a user of the wireless communication device 101. The display 112 can also utilize technology such as an LCD (Liquid Crystal Display) for conveying images to the user with an optional backlight. The keypad 116 can be an input device coupled to the processor 104 for intercepting tactile responses from the user and can also include its own backlight. These responses can be, for instance, tactile responses that represent telephone number dialing for accessing another end user or passwords or account numbers enabling the retrieval of licensed content. Generally speaking, the keypad 116 serves to control operations of the wireless communication device 101

The power supply 110 utilizes energy conversion technology for supply energy to the aforementioned components of the wireless communication device 101. The power supply 110 can be, for instance, a portable battery-operated supply for portable applications of the wireless communication device 101.

Embodiments herein can utilize push-to-talk (PTT) or push-to-connect (PTx) (109) or messaging technologies to forward a podcast link while listening to the podcast. Furthermore, links to segments of a podcast rather than the whole can be forwarded. Also, metadata can be added to the link to convey additional information along with the podcast link.

As previously mentioned, podcasting is a fast growing medium that allows almost anyone with a personal computer to produce radio or video shows that are posted for download over the internet. There are over 5000 podcasts currently available including many amateur podcasts as well as professional shows from sources such as the BBC and National Public Radio. A typical podcast listening setup includes podcatcher software installed on a listeners personal computer which allows users to subscribe to podcasts and automatically download new shows when they are made available. Downloaded shows can be transferred to portable MP3 players including dedicated devices such as the iPOD or MP3-equipped mobile phones for listening on-the-go.

While the ipod is the namesake for podcasting, mobile phones such as iDEN phones by Motorola, Inc. offer the potential for new capabilities that go beyond what today's MP3 players can do. Although other transmission technologies can by used, certain embodiments herein can leverage PTT technology to share podcasts with friends or colleagues in an easy fashion.

Currently, podcast listeners must sort through the thousands of available podcasts using web-based directories such as PodcastAlley.com or a podcatcher with built-in directories such as iTunes or iPodder. While these directories offer search capabilities and sorting-by-subject, it's still a chore to find the shows that best suit one's interests. And, the task is made more daunting because you have to subscribe, download, and listen to shows before you can make a judgment about whether a given show is "a keeper".

Embodiments herein enable a way to share great podcasts that users have found with their friends and colleagues while they are listening to a podcast on their mobile phone. A user can refer the podcast (or a link thereto) to another user perhaps because it is very entertaining or contains information that would be of interest to the other party.

While listening to the podcast, a user can press the PTT button 109 on the phone and select a contact from their contact list as a target. Rather than send the entire podcast, which could be quite large (30-50 MB is common), the phone can send a URL link and a description of the podcast to the other party. Upon receiving the link, the other party can opt to accept or reject the recommendation. If accepted, the recipient's phone can enter the URL into a podcast subscription queue in the handset. At a later point in time, perhaps at the end of the day, the recipient (103) can likely synchronize their phone with their personal computer podcast client application (residing on their personal computer 153), sometimes called a podcatcher, to get the latest podcasts. In addition to the usual process of downloading podcasts to the phone, the podcatcher software can take the additional step of querying the podcast subscription list in the phone and can discover that the user had accepted a subscription to a new podcast. This can trigger the podcatcher to subscribe and download the new podcast. As previously noted, some wireless devices will have a high-bandwidth connection (3G, 4G) and podcatcher software built-in which can eliminate the need to synchronize with a personal computer. In such an instance, the user of the remote device can receive the link and subscribe immediately rather than having to wait to synchronize with a personal computer.

Note, the podcast link is sent while listening to the podcast rather than as a simple email attachment that is sent at sometime other than while listening. This real time transfer allows for a greater degree of collaboration between the two users and offers the potential for new services.

Although the process of sending a link to a podcast is described so that an entire podcast can be subscribed and downloaded, other embodiments herein can send a link to a subset of a podcast. As an example, suppose an interview that was part of a longer podcast found to be interesting to the sender and likely to the recipient is all the sender wants to send to the recipient rather than the entire podcast, then the sender can add a start and stop time to the link. In other words, just a subset of a podcast can be specified. A possible usage example can enable a user listening to a podcast to bookmark a start and stop point in the podcast and forward the link to another party. As before, the party can accept the link and once they synchronize with their podcatcher client, the podcast will be downloaded and truncated so that just the specified part of the podcast is transferred to the user's phone.

Below, are examples of URLs for standard and bookmarked podcasts:
http://www.host.com/podcast.xml ;standard podcast
http://www.host.com/podcast.xml, start=hhmmss, stop=hhmmss ;with bookmarks The bookmarks are versatile and can be used to quote just a section somewhere in the middle of the podcast. The bookmarks can also be used with only a start or only an end point in order to specify a section of a podcast that goes from the beginning to some intermediate point or from an intermediate point to the end of the podcast.

Another aspect allows a podcast audio file to be accompanied by a sidecar file containing bookmarks that mark sections of the podcast. In this case, links that are sent via PTT to other users can contain start=#bookmark and stop=#bookmark statements that would symbolically specify start and stop points. For example:
http://www.host.com/podcast.xml, start=#bookmark1, stop=#bookmark2

The sidecar files might be a list of bookmark names along with a time index for each bookmark. This file can be implemented in XML or any other suitable format. Furthermore, the bookmarks can be accompanied by URLs that link websites to the time-related bookmarks. This can be used by the recipient phone to access the website when a bookmark is passed during playing of a podcast. The sidecar files can also contain other objects such as images, text, or multimedia that is played in association with the podcast.

Yet another aspect is that additional metadata can be appended to the podcast links. This appended metadata can include links to other websites or data that is sent along with the podcast link. This is useful, for example, if the sender wants the podcast link to be accompanied by a link to the senders Blog (weblog), moblog (mobile weblog), vlog (video blog), social contact site, or contact info from the sender such as a vcard record. The metadata can also include a note to the recipient perhaps explaining the reason for forwarding the podcast link. Here are examples of how the metadata could be sent:
http://www.host.com/podcast.xml, metadata="www.blog.com/myBlog"
http://www.host.com/podcast.xml, metadata="Check out this great podcast . . . Jenna"

Furthermore, the metadata can also include a user rating of the podcast, or text, audio or video commentary to accompany the podcast link (obviously, audio or video metadata would occupy considerably more bandwidth, but is feasible in a high-speed link). The target address to whom the podcast link is being sent could be one of the following:
1. UFMI, IP address or any other PTT addressing method.
2. SMS, MMS, or similar multimedia messaging address.
3. The target address could also include a return address (the senders address), so that the recipient can respond back with a comment, rating, or just a word of thanks.

The carrier medium for the podcast links can include any of the following:
1. Push-to-Talk (PTT) service based on iDEN, VoIP, or any other PTT technology.
2. email, MMS, or any other messaging technology provided that the link is formed and sent while listening to the podcast.

Referring to FIG. 2, a flow chart illustrating a method 200 of sharing podcast information including the step 202 of playing a podcast having associated metadata on a wireless communication device and transferring a link and the associated metadata to a remote device while playing the podcast on the wireless communication device at step 205. The method 200 can further include the optional step 203 of creating a hierarchy of metadata at the wireless communication device enabling a sender to mark a URL associated with the podcast, mark a starting point for a portion of the podcast, or mark an ending point for the podcast. The method 200 can further include the step 204 of creating a hierarchy of metadata at the wireless communication device enabling a sender to attach additional metadata to the associated metadata including links to other websites, links to a sender's weblog, mobile weblog, or video blog, or a sender's contact information.

The method 200 can further include the step 206 of receiving the link and associated metadata and decoding the associated metadata at the remote device. Decoding can involve decoding constructs including at least a Universal Resource Locator (URL) for downloading the podcast, or constructs having start times for the podcast, end times for the podcast, bookmarks for portions of the podcast, digital rights management information, display description, podcast category, or relevant images. The associated metadata can include URLs for mobile blogging, a sender's weblog, a video blog, a social contact site, contact information from a sender, or a vCard record. The method 200 can further include the step 208 of coupling the remote device to a high bandwidth channel for downloading the podcast. The coupling can involve placing the wireless communication device in a cradle and downloading the podcast over a secondary network serving as the high bandwidth channel.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A machine-readable storage, having stored thereon a computer program having a plurality of code sections executable by a machine for causing the machine to provide a communication construct used for sharing podcast information associated with a podcast, and causing the machine to:
   obtain a hyperlink capable of being sent to a remote device while playing the podcast;
   append metadata to the hyperlink associated with the podcast; and
   transfer the hyperlink and the appended metadata while a user is playing the podcast.

2. The machine-readable storage of claim 1, wherein the link is a universal record locator or similar addressing scheme to the podcast.

3. The machine-readable storage of claim 1, wherein the metadata appended comprises constructs having start times for the podcast, end times for the podcast, bookmarks for portions of the podcast, digital rights management information, display description, podcast category, or relevant images.

4. The machine-readable storage of claim 1, wherein the metadata appended comprises Universal Resource Locators for mobile blogging, a sender's weblog, a video blog, a social contact site, contact information from a sender, or a vCard record or similar contact information record.

5. The machine-readable storage of claim 1, wherein the communication construct enables podcatcher software in a user's computer to automatically download the podcast associated with the hyperlink.

6. The machine-readable storage of claim 1, wherein the hyperlink and associated metadata is decoded at the remote device to enable customized retrieval of content.

7. The machine-readable storage of claim 1, wherein the remote device retrieves the podcast associated with the hyperlink via a high bandwidth channel for downloading the podcast.

8. The machine-readable storage of claim 1, wherein the communication construct comprises a hierarchy of metadata enabling a sender to mark a Universal Resource Locator associated with the podcast, mark a starting point for a portion of the podcast, or mark an ending point for the podcast.

9. The machine-readable storage of claim 1, wherein the communication construct further comprises a hierarchy of metadata enabling a sender to attach additional metadata to the associated metadata including hyperlinks to other websites, links to a sender's weblog, mobile weblog, or video blog, or a sender's contact information.

10. A user interlace for creating a communication construct used for sharing podcast information associated with a podcast, comprising:
    an input device for creating or retrieving a hyperlink capable of being sent to a remote device while playing the podcast;
    means for appending metadata to the hyperlink associated with the podcast; and
    a communication packet generator enabling a user to transfer the hyperlink and the appended metadata while the user is playing the podcast.

11. The user interlace of claim 10, wherein the link is a universal record locator to the podcast.

12. The user interlace of claim 10, wherein the appended metadata comprises constructs having start times for the podcast, end times for the podcast, bookmarks for portions of the podcast, digital rights management information, display description, podcast category, or relevant images.

13. The user interlace of claim 10, wherein the appended metadata comprises Universal Resource Locators for mobile blogging, a sender's weblog, a video blog, a social contact site, contact information from a sender, or a vCard record or similar contact information record.

14. The user interlace of claim 10, wherein the communication construct enables podcatcher software in a user's computer to automatically download the podcast associated with the hyperlink or enables podcatcher software in the remote device to automatically download the podcast associated with the hyperlink directly to the remote device via a high-bandwidth connection used by the remote device.

15. The user interlace of claim 10, wherein the hyperlink and associated metadata is decoded at the remote device to enable customized retrieval of content.

16. The user interface of claim 10, wherein the remote device retrieves the podcast associated with the link via a high bandwidth channel for downloading the podcast.

17. The user interlace of claim 10, wherein the communication construct comprises a hierarchy of metadata enabling a sender to mark a Universal Resource Locator associated with the podcast, mark a starting point for a portion of the podcast, or mark an ending point for the podcast.

18. The user interlace of claim 10, wherein the communication construct further comprises a hierarchy of metadata enabling a sender to attach additional metadata to the associated metadata including hyperlinks to other websites, links to a sender's weblog, mobile weblog, or video blog, or a sender's contact information.

19. A machine-readable storage, having stored thereon a computer program having a plurality of code sections executable by a machine for causing the machine to perform the steps of:
    playing a podcast having associated metadata on a wireless communication device; and
    transferring a hyperlink and the associated metadata to a remote device while playing the podcast on the wireless communication device.

20. The machine-readable storage of claim 19, wherein the computer program further includes code sections for causing the machine to receive a hyperlink having at least a Universal Resource Locator for downloading the podcast and associated metadata having constructs having start times for the podcast, end times for the podcast, bookmarks for portions of the podcast, digital rights management information, display description, podcast category, or relevant images.

* * * * *